3,153,342
FLUENT MATERIAL LEVEL MEASURING APPARATUS AND METHOD OF MANUFACTURING THE SAME
Norton T. Pierce, 90 Old Marlboro Road, and Allan J. Fox, 87 Old Marlboro Road, both of Concord, Mass.
Filed Sept. 7, 1961, Ser. No. 136,586
13 Claims. (Cl. 73—301)

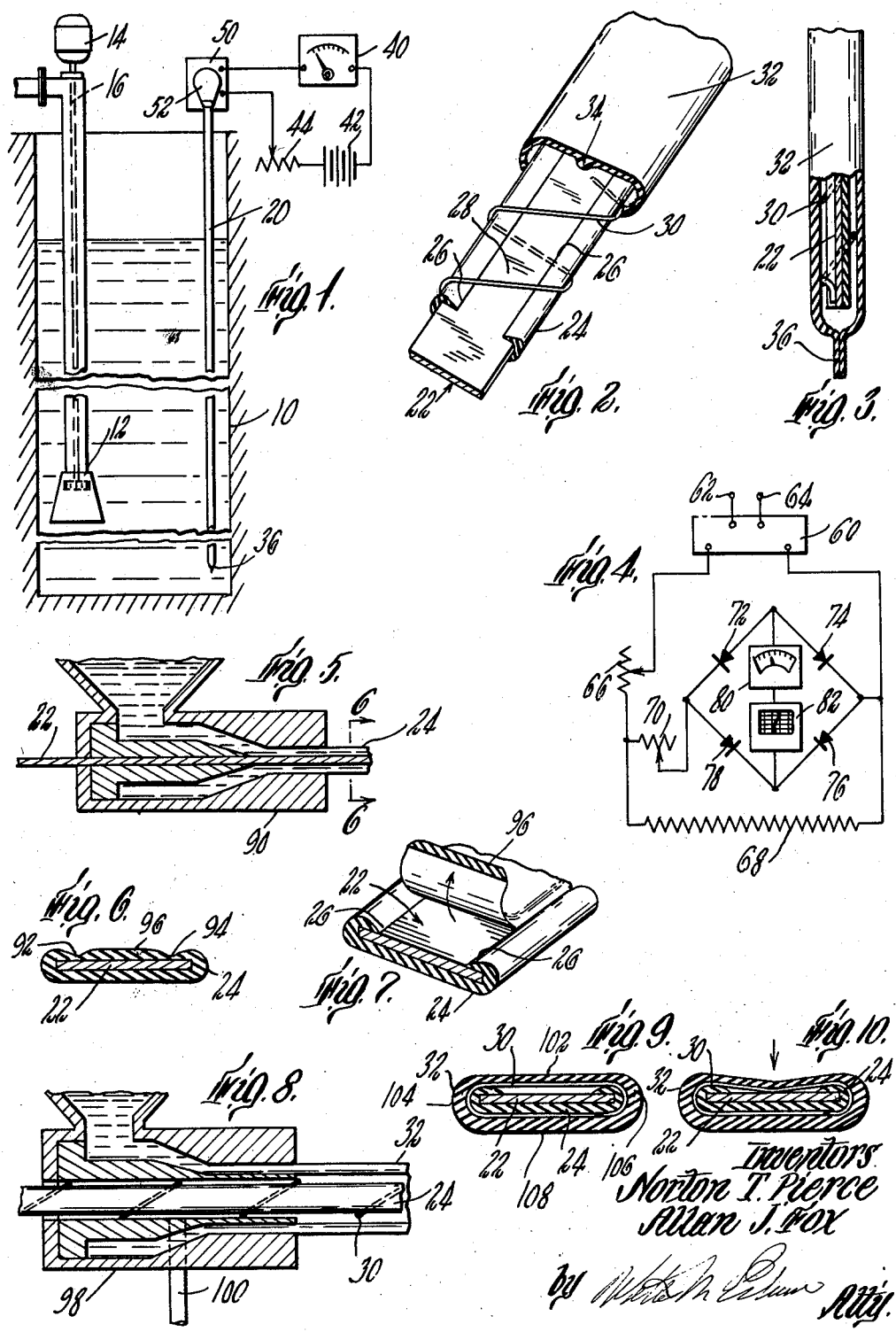

This invention relates to measuring apparatus and more particularly to apparatus for measuring the levels of liquids and granular or powdered materials, which is particularly adapted to measure the level of water in a well and to a method of manufacturing such apparatus.

In the measurement of liquid levels at remote or inaccessible locations a conventional arrangement utilizes a mechanical system of floats which rise and fall as the level of the liquid in the system varies, the change in position or the movement of the floats giving an indication of the actual height of the liquid. Such systems, however, are not particularly reliable due to excessive friction, turbulence conditions, limited available space, etc., which result in an inaccurate level indication. Also such arrangements often require substantial maintenance at frequent intervals. Other systems employ simpler arrangements in which sensors which indicate only the maximum and minimum levels and sometimes an intermediate level of particular interest in the supervised system are utilized. Other proposed solutions to the level measuring problem include the use of external mercury columns, and electrical system in which a signal is generated and reflected from the surface of the liquid. None of these systems are particularly adequate for reliable unsupervised continuous monitoring of the level of a material such as water in a deep well at a remote location for example.

Accordingly, it is an object of this invention to provide an improved level measuring apparatus for use in measuring the level of liquids and similar materials.

Another object of the invention is to provide a simple, economical and reliable level measuring apparatus which employs a novel and improved electrical sensing element.

Another object of the invention is to provide an improved level measuring apparatus which includes an electrical resistance element housed in a tubular pressure responsive casing suitable for use in applications where the material whose level is being measured might have an adverse effect on the electrical system if contact of the material with the measuring component was permitted.

Still another object of the invention is to provide a novel level sensing element of small cross-section suitable for installation in a confined space and which provides accurate indication of the true level of material in that space.

A further object of the invention is to provide a novel and improved level sensing element capable of manufacture in accordance with mass production methods which has a characteristic affording ease in manipulation and versatility in use.

Still another object of the invention is to provide a novel method for manufacturing an improved level measuring apparatus.

A further object of the invention is to provide a novel and improved elongated sensitive level measuring instrument which includes an electrical conductor of substantial resistance resiliently spaced from a second electrical conductor housed in a flexible casing for positioning in the material whose level is to be measured.

In accordance with principles of the invention there is provided an electrical level measuring apparatus which includes a sensing element comprising an elongated strip conductor and a helical conductor wound about the strip conductor and normally is maintained in spaced relationship therefrom by appropriately located electrical insulation. At least one of the conductors has significant electrical resistance characteristics. The conductors are preferably electrically connected together at one end of the sensing element and both conductors are encased in a closely conforming flexible tube which is sealed at that one end. Electrical circuit apparatus, connected to both the strip conductor and the helical conductor at the opposite end of the sensing element, includes means to measure the resistance of the conductor circuit which measurement provides an indication of the level of the material in which the assembly is disposed. In a preferred embodiment of the invention the conductive strip is a flat strip of indeterminate length which has a plastic insulator extruded about it with a longitudinal surface portion of the conductive strip exposed. A resistance wire is then helically wound about the insulator and the conductive strip so that the resistance wire rests on the insulator and is spaced from the strip over the longitudinal exposed portion. This resistance wire is wound with an amount of tension such that the resistance wire will normally be maintained in spaced relationship to the strip but will flex sufficiently to contact the strip if a predetermined amount of pressure is exerted on the wire. Extruded over the outside of this helical wire and conductor strip is a tube of electrical insulation. This tube preferably is formed in the extruding operation in a manner such that sufficient space is maintained between the helical wire and the outer sleeve, to permit slight longitudinal movement of the helical wire-strip conductor assembly within the sleeve. After this operation the resulting product is cut into desired lengths of sensing elements. In each length of sensing element the resistance wire is suitably secured to the strip conductor at one end and the sleeve is appropriately sealed over that end to provide a fluid tight tubular casing. Means to conduct electrical measuring circuitry to the conductor strip and to the resistance wire are provided at the opposite end of the sensing element. When used in a water well or similar environment the top end of the strip is also sealed in an expansible chamber inside a protective box through which electrical leads are brought out. This arrangement accommodates changes in the volume of air space within the sensing element tube as the material level changes while insuring the electrical integrity of the sensing element.

When the sensing element is positioned in the material whose level is to be measured the pressure of the material on the outside of the tubular sleeve causes the resistance wire to bend and contact the conductive strip so that the section of the resistance wire below the surface of the material is shorted out. The electrical circuitry connected to the sensing element measures the resulting resistance of the element and the associated instruments may be calibrated to provide a direct measurement of the actual level of the material. While the sensing element system is particularly useful in water well level measurements, the system also may be used for measuring levels of other liquids and other substances such as granular or powdered materials, and herein the term "fluent materials" is used in a generic sense for the purpose of defining the invention. The invention provides a simple and reliable apparatus capable of economical manufacture which is particularly useful in accurately measuring the level of fluent materials disposed at remote or comparatively inaccessible locations.

Other objects, features and advantages of the invention will be seen as the following description of preferred embodiments thereof progresses, in conjunction with the drawings, in which:

FIG. 1 is a diagrammatic view of the level measuring apparatus constructed according to principles of the invention employed in a deep water well for continuously providing an accurate indication of the water level therein;

FIG. 2 is a perspective view of a portion of the sensing element constructed in accordance with principles of the invention;

FIG. 3 is an end elevational view, partly in section, of the lower end of the sensing element;

FIG. 4 is a schematic diagram of a preferred form of electrical circuit for measuring the resistance of the sensing element;

FIG. 5 is a diagrammatic view illustrating an initial step in forming the sensing element involving the extrusion of a plastic insulator about the center conductor strip;

FIG. 6 is a sectional view on the center strip and extruded insulator taken along the line 6—6 of FIG. 5;

FIG. 7 is a perspective view of the strip and extruded insulator material with a central portion of the insulation being stripped therefrom;

FIG. 8 is a diagrammatic view of a second extruding operation in which a flexible tubular sleeve is formed over the helical wire and central strip conductor;

FIG. 9 is a sectional view illustrating a second embodiment of a sensing element assembly constructed in accordance with principles of the invention; and FIG. 10 is a sectional view similar to FIG. 9 which illustrates the flexing of the sleeve and resistance wire under pressure to provide positive electrical contact between the wire and the central strip conductor.

There is illustrated in FIG. 1 a water well 10 having a conventional pump 12 connected in driven relationship to a motor 14 by shaft 16. Also positioned in the well outside of the main conduit 18 is an elongated level sensing element 20 that extends below the pump inlet to the vicinity of the bottom of the well casing. Typically, water well casings have only limited space surrounding the main water conduit 18, and it will be understood that while the dimensions of the well illustrated in FIG. 1 have been exaggerated to increase the clarity of the drawing, frequently only a sensing element of extremely compact cross section can be inserted into the well.

As indicated in FIG. 2 the sensing element assembly includes a center conductor strip 22 which may be of stainless steel—0.437" wide and .018" thick, for example, with an electrical insulation portion 24 covering each longitudinal edge of the strip. That electrical insulation may be an unplasticized polyvinyl chloride, or a linear polyethylene material. Each portion 24 has a transition tapered to the point of contact 26 with surface 28 of the strip 22. In the preferred embodiment the insulation extends beneath the strip so that the two edge portions 24 are connected. A resistance wire 30, which may be a nichrome wire .006" in diameter, for example, is wound in a helix about the strip 22 and insulation portion 24 with sufficient tension so that the resistance wire does not contact the conductive strip in the absence of pressure and requires about one ounce of force perpendicular to the strip 22 to make electrical contact. The electrical insulation 24 preferably has resilient characteristics which assist in maintaining the desired relation between the wire helix 30 and the central strip 22. Positioned over this assembly is a fluent material impervious, tubular electrically insulating sleeve 32 which may be a tube of conventional polyethylene having .015" wall thickness, for example, or a similar tube of an elastomeric polyethylene such as that sold by Dow Chemical under the trademark "Zetafin" or by Union Carbide as "Bakelite Elastomeric Polyethylene Copolymer." This sleeve may include an integrally formed, internal, longitudinally extending rib 34 disposed above the wire 30 and aligned with the exposed longitudinal portion 28 of the strip 22 and may be dimensioned to be only slightly larger than the overall dimensions of the resistance wire-central strip assembly so as to permit moderate relative movement of the strip assembly within the sleeve. This structure may be manufactured in an indeterminate length and a portion thereof severed to form the required length of the sensing element. The end of the resistance wire is secured to the strip 22 as indicated in FIG. 3, by solder or other suitable means, and the end of the tube 32 is then closed, as with heat in the case of polyethylene, to form an end seal 36. Additionally the end seal 36 may be taped, if desired, to insure the continued integrity of the seal. This sensing cable assembly is positioned in the liquid or other fluent material whose level is to be measured as shown in FIG. 1, suitably supported at its upper end. A weight may be secured to the lower end thereof to insure the substantially vertical disposition of the sensing cable. At its upper end electrical circuitry connections are made to the strip 22 and to the helical wire 30. That circuitry, as shown in FIG. 1, may include a meter 40, a source of electrical energy such as a battery 42 and an adjustable resistance 44. The connections are made to the sensing cable in a protective box 50 in which is positioned an expansible chamber 52, in the form of a flexible plastic bag, for example, which encloses the terminations of the strip and wire. This chamber seals the sleeve and provides compensation for gas movements resulting from changes in pressure on the sleeve. A hygroscopic material such as silica gel or glycerine for absorbing any moisture within the sleeve 32 may be included within the expansible chamber 52 to insure maintenance of the electrical integrity of the sensing cable system.

In the operation of the level measuring system, the pressure of the fluent material on the outside of the portions of the sleeve 32 that are beneath its surface forces these portions inwardly against the resistance wire 30 and displaces that wire so that it contacts the conductive strip 22, shorting out the portion of the wire below that point. The current flowing through the electrical circuitry as produced by the voltage source 42 is a function of the resistance in the circuit which includes the resistance of the wire 30 and the resistance of the strip 22 down to the point where the wire first is forced, by the lateral pressure of the material in which it is immersed, into contact with the strip. The meter 40 provides an indication of this variable resistance and may be calibrated to read the depth of the material directly in feet or other suitable units. Other suitable indicating instruments such as electrical recorders may be utilized to provide continuous recording of level variations as a function of time.

Where the system is to be in continuous use it may be preferable to obtain electrical energy from a 120 volt alternating current supply, for example, rather than from a battery. In such case, a voltage stabilizer circuit and an additional resistance in series with the measuring cable results in a more linear meter indication. Suitable circuitry of this type is shown in FIG. 4 in which voltage stabilizer circuitry 60 is connected to a 120 volt source at terminals 62, 64. The output of this circuitry is applied through an adjustable 13,000 ohm resistor 66 which is connected in series with the resistance 68 of the cable. A measuring circuit which includes adjusting resistance 70 and a bridge rectifier circuit including rectifier elements 72, 74, 76, 78 is connected across the cable resistance 68. As illustrated, the measuring circuitry connected across the bridge rectifier includes a meter 80 (which reads one milliampere full scale) and a suitable recorder 82.

Certain steps employed in the preferred method of manufacture of the measuring cable are indicated in FIGS. 5–8. In FIG. 5 the step of continuously extruding an insulating plastic over the center conductor strip 22 of indeterminate length through a mold is diagrammatically shown. In this operation the strip 22 is fed through the extrusion mold and the plastic material 24 is formed about it encasing the entire strip with only thin webs 92, 94 of the plastic provided at spaced points in the upper surface. This center strip 96 between the webs 92, 94 may be stripped from the conductor 22 as shown in FIG. 7 with the thin web portions severing easily so that the center portion 28 of the conductor is exposed.

In the molding operation the portions 24 of the plastic covering the marginal edges of strip 22 are tapered to provide the tapered configuration of its edges 26, immediately adjacent the exposed center portion of strip 22.

The resistance wire 30 is then wound in helical fashion with a one inch pitch, for example, about the assembly to provide a continuous resistance conductor that extends along the length of the assembly.

This helical wire insulator and central conductor assembly are then processed through a second extruding operation with the apparatus diagrammatically shown in FIG. 8. In that apparatus an extrusion die 98 is utilized which includes a fluid pressure conduit 100 for introducing a fluid such as air into the extrusion area so that an air flow over the outside of the helical wire-central conductor assembly creates a pressure differential which prevents the extruded plastic material from collapsing onto the assembly immediately after it is extruded and before it has been transferred to a cooling bath where the plastic is solidified. In this manner the sleeve 32 is extruded over the helical wire and central conductor configuration in an economical operation suitable for mass production and which permits limited relative movement between the sleeve and the encased structure sufficient to accommodate any such relative movement necessary for assembly purposes or such as might occur during handling, shipping and installation operations without impairing the electrical integrity of the conductor assembly.

As indicated above, this method of manufacture enables a center conductor element of indeterminate length to be subjected to the series of extruding and winding steps, and the resulting assembly subsequently cut into segments of the desired lengths. The sleeve is then slid up from over the end of the conductor so that the resistance wire may be welded or otherwise suitably secured in electrical relation to the central conductor and then slid down over the end and sealed at that point so that the sleeve provides an impervious casing for the cable assembly.

The sleeve may have a longitudinal rib 34 formed in it immediately above the exposed portion of the central conductor 22 if desired. Such a rib affords additional rigidity and stability to the sleeve at this point and the sleeve will be caused to flex more uniformly under pressure acting on the outer surface of the sleeve, to force the resistance wire 30 into contact with the center conductor 22. A second configuration of the sleeve is indicated in FIGS. 9 and 10 in which the rib 34 is omitted and the thickness of the section 102 of the sleeve immediately over the exposed section of the central conductor 22 is relatively thin with end sections 104, 106 of intermediate thickness and a relatively thick section 108 along the back of the conductor 22. A slight increase in sensitivity of the sensing cable may be achieved by providing exposed sections on both sides of strips 22 so that there is less longitudinal distance between points at which the resistance wire may contact the strip for a given helix pitch.

As indicated in FIG. 10 when sufficient pressure is exerted on the sleeve the section over the exposed portion of conductor 22 is forced inwardly toward the conductor and acts against the wire 30 to drive it into electrical contact therewith. In the illustrated and described embodiments the initial point of contact occurs about 6–8 inches below the surface of the water when the sensing element is used with that material, and all lower points of the wire are also shorted to the center conductor. Thus the measured resistance is a direct function of the length of wire 30 from the top of the cable to the point of first contact with strip 22 and a reliable indication of the actual water level is provided.

In the illustrated embodiments the sleeve seals the entire assembly and excludes any foreign material which might interfere with the proper operation of the system. Compensation for changes in pressure and in the measuring cable are provided by the expansion chamber 52 which seals the upper end of the assembly. The sensing element assembly is capable of inexpensive manufacture and is a compact yet sturdy product but having sufficient flexibility so that it may be coiled, for example, for ease in handling and shipping. The apparatus, when appropriately positioned in the material which it is to supervise, simply and reliably provides an accurate indication of the level of that material. While preferred embodiments have been shown and described, various modifications will occur to those having ordinary skill in the art. For example, the resistance relations of conductors 22 and 30 might be altered as might the configurations of those and other elements of the assembly; other electrical measuring circuitries might be employed; etc., all without departing from principles of the invention as defined by the claims. Therefore, while two embodiments have been shown in the drawing and described in conjunction therewith, it is not intended that the invention be limited to these embodiments or to details thereof, and departures may be made therefrom within the spirit and scope of the invention as defined in the claims.

We claim:

1. A cable assembly for level indicating apparatus, said cable assembly being adapted to be disposed generally vertically in the material whose level is to be measured, comprising a central conductor, a second conductor disposed in helix relation about said central conductor, electrical insulation means on said central conductor adapted to normally maintain said second conductor in spaced relationship from said central conductor, and a tubular sleeve disposed over said conductors and said insulation means, said insulation means being arranged so that an area of said central conductor is exposed along the length of said central conductor at which said second conductor may be flexed into electrically conductive contact with said second conductor when a pressure is exerted on said second conductor, at least one of said conductors having significant electrical resistance characteristics, said central conductor and said second conductor being arranged in secured relationship relative to one another at one end of said assembly and said sleeve being sealed at said one end of said assembly to securely enclose said conductors, and means to connect electrical circuit apparatus to said conductors at the other end of said assembly.

2. The cable assembly as claimed in claim 1 wherein said sleeve has a longitudinally extending rib formed on the inner surface thereof, said rib being aligned with said exposed area.

3. The cable assembly as claimed in claim 1 wherein said sleeve has a comparatively thin section immediately over said exposed area and thicker sections in other portions of the sleeve.

4. The cable assembly as claimed in claim 1 and further including an expansible chamber sealed to said sleeve at said other end of said assembly, said chamber providing compensation for gas movement within said sleeve in response to changes in the level of the material in which said cable assembly is disposed.

5. A cable assembly for level indicating apparatus adapted to be disposed generally vertically in the material whose level is to be measured, said cable assembly including an elongated conductive central strip, a resistance wire disposed in helix relation about said central conductor, resilient electrical insulation means on said central strip adapted to normally maintain said resistance wire in spaced relationship from said central strip, and a tubular sleeve disposed over said central strip, said resistance wire and said insulation means, said insulation means being arranged so that an area of said central strip is exposed along the length of said central strip at which said resistance wire may be flexed into electrically conductive contact with said second conductor responsive to a pressure exerted laterally to said strip on said second conductor via said sleeve, said central strip and said resistance wire being arranged in secured relationship relative to one another at one end of said assembly and said sleeve being sealed at said one end of said assembly to securely enclose said conductors, and means to connect electrical circuit apparatus to said central strip and said resistance wire at the other end of said assembly, said electrical circuit means including means to supply electrical energy to said conductors and resistance measuring means to indicate the portion of said second conductor not urged into contact with said central conductor by the pressure of the material in which said cable assembly is disposed against said sleeve.

6. Level indicating apparatus comprising a cable assembly adapted to be disposed generally vertically in the material whose level is to be measured, said cable assembly including a central conductor, a second conductor disposed in helix relation about said central conductor, spacing means to normally maintain said second conductor in spaced relationship from said central conductor, said spacing means being arranged so that areas are provided at periodic intervals along the length of said central conductor where said second conductor may be flexed into electrically conductive contact with said central conductor when a pressure is exerted on said second conductor, at least one of said conductors having significant electrical resistance characteristics, said central conductor and said second conductor being arranged in secured relationship relative to one another at one end of said assembly, and electrical circuit means connected to said conductors at the other end of said assembly, said electrical circuit means including resistance measuring means to indicate the portion of said second conductor not urged into contact with said central conductor by the material in which said cable assembly is disposed.

7. Level indicating apparatus comprising a cable assembly adapted to be disposed generally vertically in the material whose level is to be measured, said cable assembly including an elongated central electrically conductive strip, a resistance wire wound in helix relation about said central strip, and electrical insulation means on said central strip adapted to normally maintain said resistance wire in spaced relationship from said central strip, a portion of said strip extending the length of said strip not being covered by said electrical insulation means such that said resistance wire may be flexed into electrically conductive contact with said central strip when a pressure lateral to said strip is exerted on said resistance wire, said central strip and said resistance wire being arranged in secured relationship relative to one another at one end of said assembly, and electrical circuit means connected to said strip and said resistance wire at the other end of said assembly, said electrical circuit means including resistance measuring means to indicate the portion of said resistance wire not urged into contact with said central strip by the material in which said cable assembly is disposed.

8. Indicating apparatus for monitoring the level of a fluent material comprising a cable assembly adapted to be disposed generally vertically in said material, said cable assembly including a central conductor, a second conductor disposed adjacent said central conductor, resilient electrically insulating spacing means supporting said central and second conductors relative to one another and normally maintaining said second conductor in spaced relationship from said central conductor, said spacing means being arranged so that areas are provided at periodic intervals along the length of said central conductor where said second conductor may be flexed into electrically conductive contact with said central conductor when a pressure is exerted on said second conductor, at least one of said conductors having significant electrical resistance characteristics, said central conductor and said second conductor being arranged in secured relationship relative to one another at one end of said assembly, a tubular sleeve impervious to the fluent material disposed over said central and second conductors, and means to connect electrical circuit means to said conductors at the other end of said assembly, said electrical circuit means including means to apply electrical energy to said conductors and resistance measuring means to indicate the portion of said second conductor not urged into contact with said central conductor by the fluent material in which said cable assembly is disposed.

9. Indicating apparatus for monitoring the level of a fluent material comprising a cable assembly adapted to be disposed generally vertically in said material, said cable assembly including a central conductor strip, a resistance wire wound in a helix about said central conductor strip, resilient electrical insulation means on said central strip adapted to normally maintain said resistance wire in spaced relationship from said central conductor strip, said insulation means encasing said central strip except for a portion of one surface thereof extending the length of said strip so that said resistance wire may be flexed into electrically conductive contact with said central conductor at said surface portion when pressure is exerted on said resistance wire laterally to said central strip, said central strip and said resistance wire being arranged in secured relationship relative to one another at one end of said assembly, a flexible tubular sleeve disposed over said central strip and said resistance wire and sealed at said one end of said assembly, and means to connect electrical circuit means to said central strip and said resistance wire at the other end of said assembly, said electrical circuit means including means to apply electrical energy to said strip and wire and resistance measuring means to indicate the portion of said resistance wire not urged into contact with said central conductor by the fluent material in which said cable assembly is disposed.

10. The apparatus as claimed in claim 9 wherein said sleeve has a longitudinally extending rib formed on the inner surface thereof, said rib being aligned with said exposed area.

11. The apparatus as claimed in claim 9 wherein said sleeve has a comparatively thin section disposed immediately over said exposed surface portion of said central strip and thicker sections in other portions thereof.

12. The apparatus as claimed in claim 9 and further including an expansible chamber sealed to said sleeve at said other end of said assembly, said chamber providing compensation for gas movement within said sleeve in response to changes in the level of the material in which said cable assembly is disposed.

13. The apparatus as claimed in claim 9 wherein the thickness of said insulation adjacent the edges of said exposed area is tapered down toward the exposed area to provide a smooth transition between said insulation and said exposed area.

References Cited in the file of this patent

UNITED STATES PATENTS

| | | |
|---|---|---|
| 2,284,078 | Wiegard | May 26, 1942 |
| 2,541,576 | Detuno | Feb. 13, 1951 |
| 2,713,793 | Anderson | July 26, 1955 |
| 3,037,266 | Pfister | June 5, 1962 |

FOREIGN PATENTS

| | | |
|---|---|---|
| 716,958 | Great Britain | Oct. 20, 1954 |